United States Patent
Calciu et al.

(10) Patent No.: US 10,761,984 B2
(45) Date of Patent: Sep. 1, 2020

(54) USING CACHE COHERENT FPGAS TO ACCELERATE REMOTE ACCESS

(71) Applicant: VMware, Inc., Palo Alto, CA (US)

(72) Inventors: Irina Calciu, Palo Alto, CA (US);
Jayneel Gandhi, Sunnyvale, CA (US);
Aasheesh Kolli, Palo Alto, CA (US);
Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/048,186

(22) Filed: Jul. 27, 2018

(65) Prior Publication Data

US 2020/0034294 A1 Jan. 30, 2020

(51) Int. Cl.
*G06F 9/455* (2018.01)
*G06F 12/0815* (2016.01)
*G06F 12/0862* (2016.01)
*G06F 12/1009* (2016.01)

(52) U.S. Cl.
CPC ...... *G06F 12/0815* (2013.01); *G06F 9/45558* (2013.01); *G06F 12/0862* (2013.01); *G06F 12/1009* (2013.01); *G06F 2009/45583* (2013.01)

(58) Field of Classification Search
CPC .............................. G06F 9/455–45554; G06F 2009/45562–45595
See application file for complete search history.

(56) References Cited

U.S. PATENT DOCUMENTS

| | | | |
|---|---|---|---|
| 5,764,934 A | 6/1998 | Fisch et al. | |
| 6,275,907 B1 | 8/2001 | Baumgartner et al. | |
| 7,415,575 B1 * | 8/2008 | Tong | G06F 12/126 711/129 |
| 9,058,272 B1 | 6/2015 | O'Bleness et al. | |
| 2005/0240745 A1 * | 10/2005 | Iyer | G06F 12/0223 711/167 |
| 2006/0059317 A1 * | 3/2006 | Kakeda | G06F 12/0833 711/145 |
| 2008/0086600 A1 * | 4/2008 | Qiao | G06F 16/172 711/133 |
| 2009/0300289 A1 | 12/2009 | Kurts et al. | |
| 2010/0274987 A1 | 10/2010 | Subrahmanyam et al. | |
| 2010/0313201 A1 * | 12/2010 | Warton | G06F 12/1027 718/1 |
| 2011/0252200 A1 | 10/2011 | Hendry et al. | |

(Continued)

*Primary Examiner* — Nicholas J Simonetti
(74) *Attorney, Agent, or Firm* — Patterson + Sheridan, LLP (57) ABSTRACT

Disclosed are embodiments for running an application on a local processor when the application is dependent on pages not locally present but contained in a remote host. The system is informed that the pages on which the application depends are locally present. While running, the application encounters a cache miss and a cache line satisfying the miss from the remote host is obtained and provided to the application. Alternatively, the page containing the cache line satisfying the miss is obtained and the portion of the page not including the cache line is stored locally while the cache line is provided to the application. The cache miss is discovered by monitoring coherence events on a coherence interconnect connected to the local processor. In some embodiments, the cache misses are tracked and provide a way to predict a set of pages to be pre-fetched in anticipation of the next cache misses.

20 Claims, 8 Drawing Sheets

(56) References Cited

U.S. PATENT DOCUMENTS

| | | |
|---|---|---|
| 2015/0052309 A1 | 2/2015 | Philip et al. |
| 2015/0095585 A1 | 4/2015 | Subrahmanyam et al. |
| 2016/0321181 A1 | 11/2016 | Kaxiras et al. |
| 2017/0031825 A1* | 2/2017 | Chen .................. G06F 12/0862 |
| 2017/0192886 A1 | 7/2017 | Boehm et al. |

* cited by examiner

USING CACHE COHERENT FPGAS TO ACCELERATE REMOTE ACCESS

CROSS-REFERENCE TO RELATED APPLICATIONS

This application is related to:

U.S. application Ser. No. 16/048,180, filed on Jul. 27, 2018, which application is incorporated by reference in its entirety into the present application, U.S. application Ser. No. 16/048,182, filed on Jul. 27, 2018, U.S. application Ser. No. 16/048,178, filed on Jul. 27, 2018, and U.S. application Ser. No. 16/048,183, filed on Jul. 27, 2018.

BACKGROUND

In a case in which an application is run, but its pages are not present on the host running the application, the application incurs page faults and the needed pages are obtained from a remote host. The pages faults are expensive to process and the time to obtain the needed page while the application is waiting to run can be excessive. It is desirable to improve the efficiency of a running application which depends on pages not locally present.

SUMMARY

An embodiment is a method for running an application dependent on remote memory. The method includes indicating to the application that pages of the running application are all present in the local memory so that memory accesses by the running application cause cache misses instead of page faults, receiving notice of a cache miss caused by the application running locally, obtaining a cache line satisfying the cache miss from a host responsible for the remote memory containing the cache line using a translation table and a network connection to the responsible host, copying the obtained cache line into the local memory, and providing the cache line to the running application.

Further embodiments include a device configured to carry out one or more aspects of the above method and a computer system configured to carry out one or more aspects of the above method.

BRIEF DESCRIPTION OF THE DRAWINGS

FIB. 4C depicts a flow chart of an embodiment of the request handling module.

DETAILED DESCRIPTION

Figure 1:
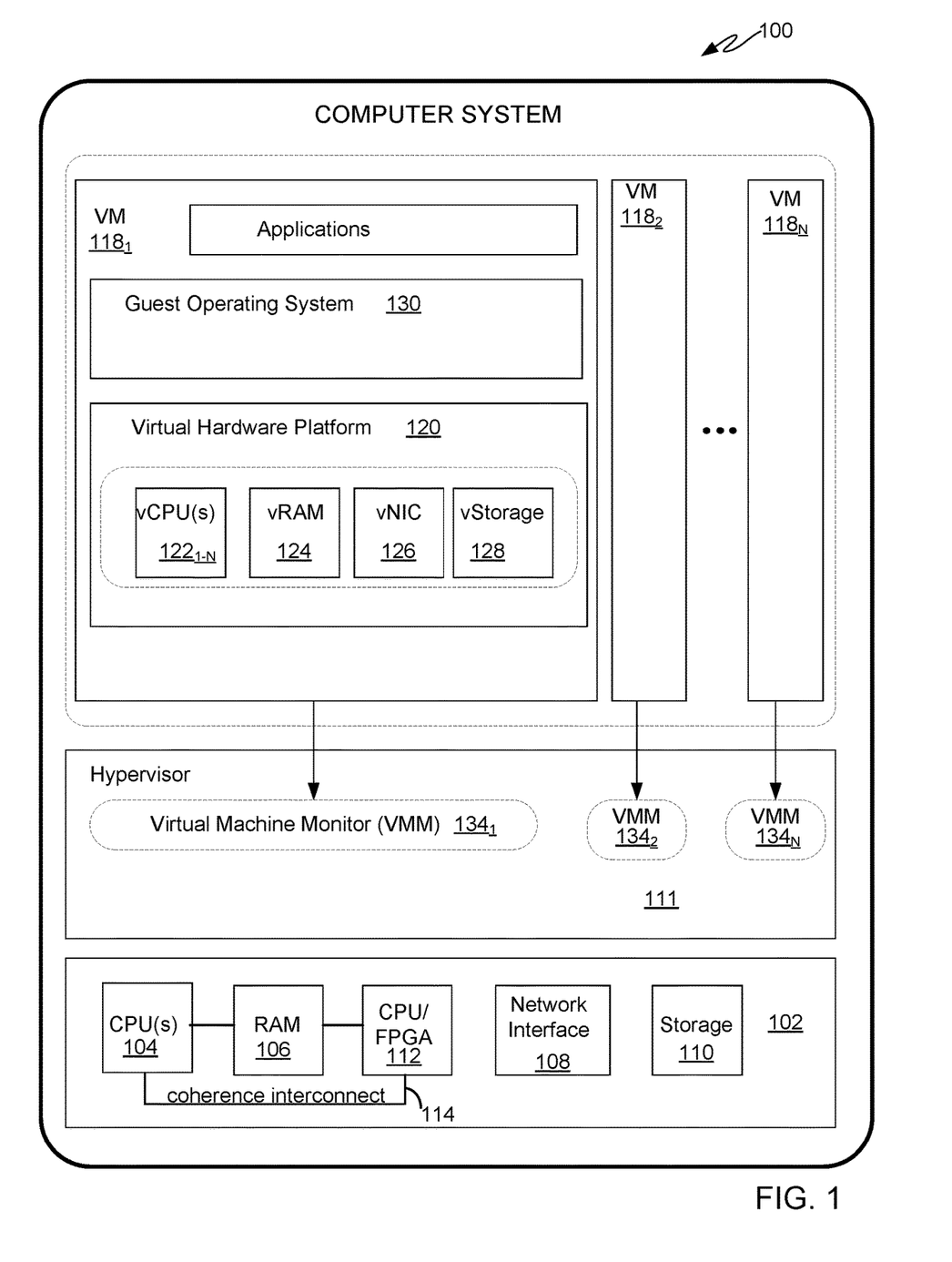
FIG. 1 depicts a block diagram of a computer system that is representative of a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more central processing units (CPUs) 104, a point-to-point coherence interconnect 114 between processors which supports a cache coherence protocol, such as the UltraPath Interconnect (UPI), random access memory (RAM) 106, one or more network interfaces 108, and persistent storage 110. In the embodiment illustrated herein, a field programmable gate array (FPGA) 112 is installed in one of the CPU sockets and communicates with one or more CPUs 104 via coherence interconnect 114.

A virtualization software layer, referred to herein after as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
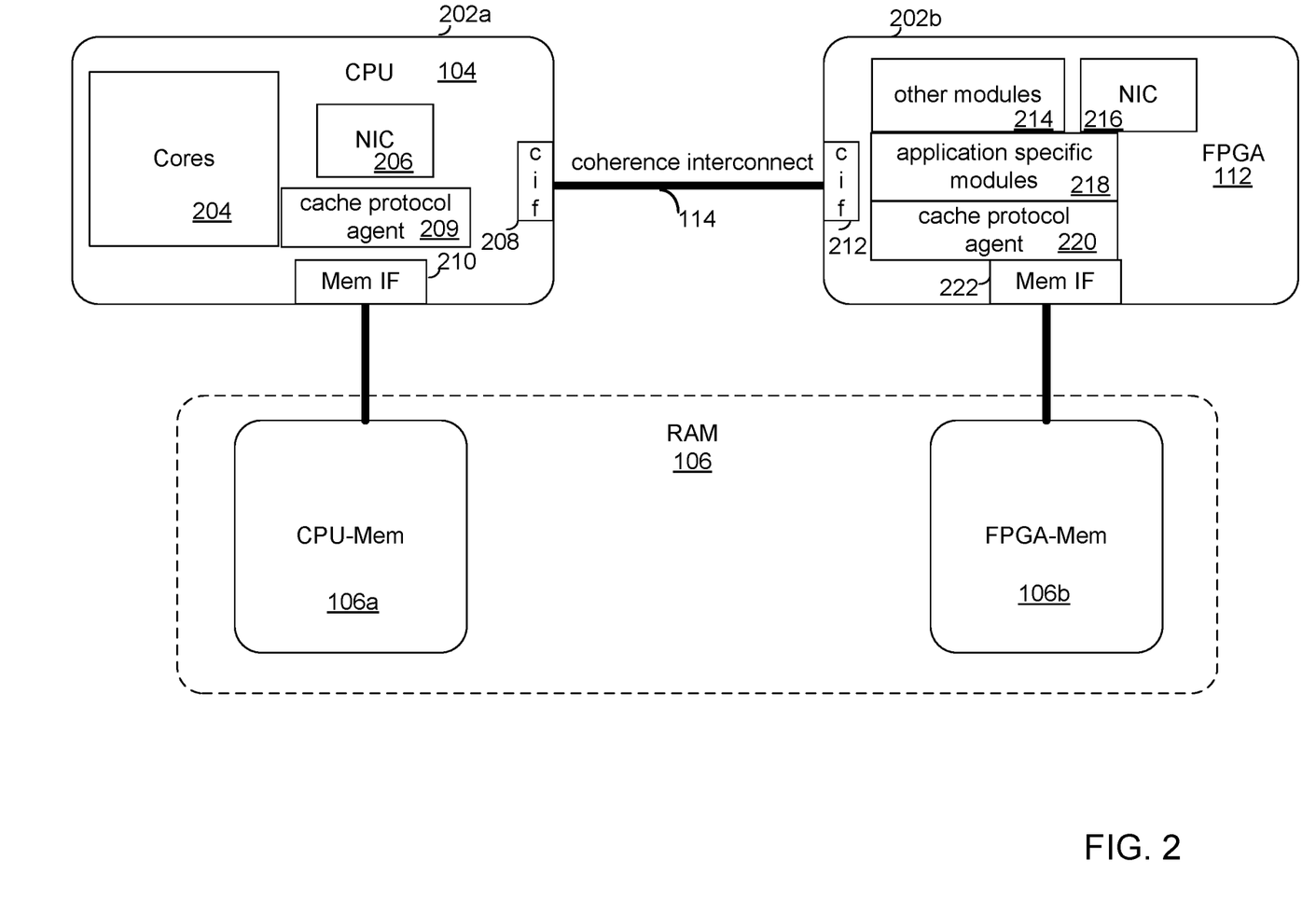
FIG. 2 depicts a block diagram of a pair of CPU sockets for CPUs in FIG. 1, in an embodiment.

FIG. 2 depicts a block diagram of a pair of CPU sockets, with a first socket 202a for CPU 104 and a second socket 202b for FPGA 112. CPU 104 includes one or more processing cores 204, an interface 210 to CPU memory (CPU-Mem) 106a accessible by CPU 104, a network interface controller (NIC) 216, a communications interface (cif) port 208 connected to coherence interconnect 114 and a cache protocol agent 209. FPGA 112 is configured with a network interface 216, one or more application-specific modules 218, a cif port 212 and a cache protocol agent 220. Application specific modules 218 are configured by a bitstream representing custom programming of FPGA 112. Other modules and functions 214 whose operations are unrelated to application-specific modules 218 may be present in FPGA 112, these modules and functions being configured by a bitstream different from the custom programming bitstream. FPGA 112 has an interface 222 to its own memory, FPGA memory 106b (FPGA-Mem), which is a restricted portion of RAM 106. In one embodiment, each CPU socket represents a separate Non-Uniform Memory Access (NUMA) domain. The application or the VM is running on the CPU, located on the first socket 202a, while the FPGA is on the second socket 202b.

In one embodiment, the CPU 104 has a cache (not shown in FIG. 2), which is used to reduce the average cost to access data from the memory. Data transferred between memory and cache in blocks of fixed size, called cache lines or cache blocks. When a cache line is copied from memory into the cache, a cache entry is created, which includes the copied data as well as the requested memory location (called a tag). When the CPU needs to read or write a location in the memory, it first checks for a corresponding entry in the cache. The cache checks for the contents of the requested memory location in any cache lines that might contain that address. If the processor finds that the memory location is in the cache, a cache hit has occurred; the CPU immediately reads or writes the data in the cache line. However, if the CPU does not find the memory location in the cache, a cache miss has occurred. For a cache miss, the cache allocates a new entry and copies data from main memory, then the request is fulfilled from the contents of the cache.

Cif ports 208, 212, mentioned above, support a coherence protocol, which is designed to maintain cache coherence in a system with many processors each having its own cache. With FPGA 112 residing in one socket 202b of the CPU sockets and having its own cif port 212, FPGA 112 can monitor and participate in the coherency protocol that keeps the processor caches coherent.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache.

To enforce the cache coherence protocol requires a cache protocol agent for each cache connected to a coherence interconnect. Each cache protocol agent can initiate and respond to transactions on the coherence interconnect by sending and receiving messages on the interconnect. In the present embodiments, CPU 104 has cache protocol agent 209 and FPGA 112 has cache protocol agent 220.

When a CPU accesses a cache line that is not in its cache, at any level of the cache hierarchy, cache protocol agent 209 of CPU 104 requests the cache line. Thus, cache protocol agent 209 in the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the CPU hardware caches, if it is modified, it must be written back to the memory from which it originated. The operation of writing the cache line back is present on coherence interconnect 114 as a writeback transaction and can be monitored for tracking dirty cache lines. In the case of a writeback transaction, the cache line is actually dirty, rather than potentially dirty.

To confirm whether a cache line is dirty or not, a cache protocol agent, such as agent 220 in FPGA 112, can snoop the cache line in accordance with the coherence interconnect protocol. This causes a writeback transaction to be triggered, if the cache line is dirty.

Messages corresponding to cache coherence events involved in the various embodiments described below include 'Load_Data_CL' and 'WB_Data_CL'. The 'Load_Data_CL' message occurs when a cache line (CL) is loaded as exclusive into a processor cache. A 'WB_Data_CL' message occurs when a processor writes back a cache line into memory because the cache line is dirty and is being evicted from the cache. Additionally, a 'WB_Data_CL' message can occur when a processor executes a store instruction, which bypasses the caches in the cache hierarchy. Such a store instruction is recognized by cache protocol agent 220 of FPGA 112. The messages are asynchronous messages to and from the appropriate independently operating modules and functions in the descriptions herein. More particularly, a step, 'Send(msg to dest)', is an asynchronous non-blocking transmission of a message, msg, to a destination, dest, and a step, 'Received(msg)', is a predicate, which if true is interpreted as signaling that a message, msg, has been received. If false, no message has been received, and the function or module is blocked waiting for a message to arrive. However, the function or module can configure the predicate so that by testing the predicate, the function or module can avoid being blocked. Embodiments described herein are not limited by any specific form or method of sending or receiving messages.

Figure 3:
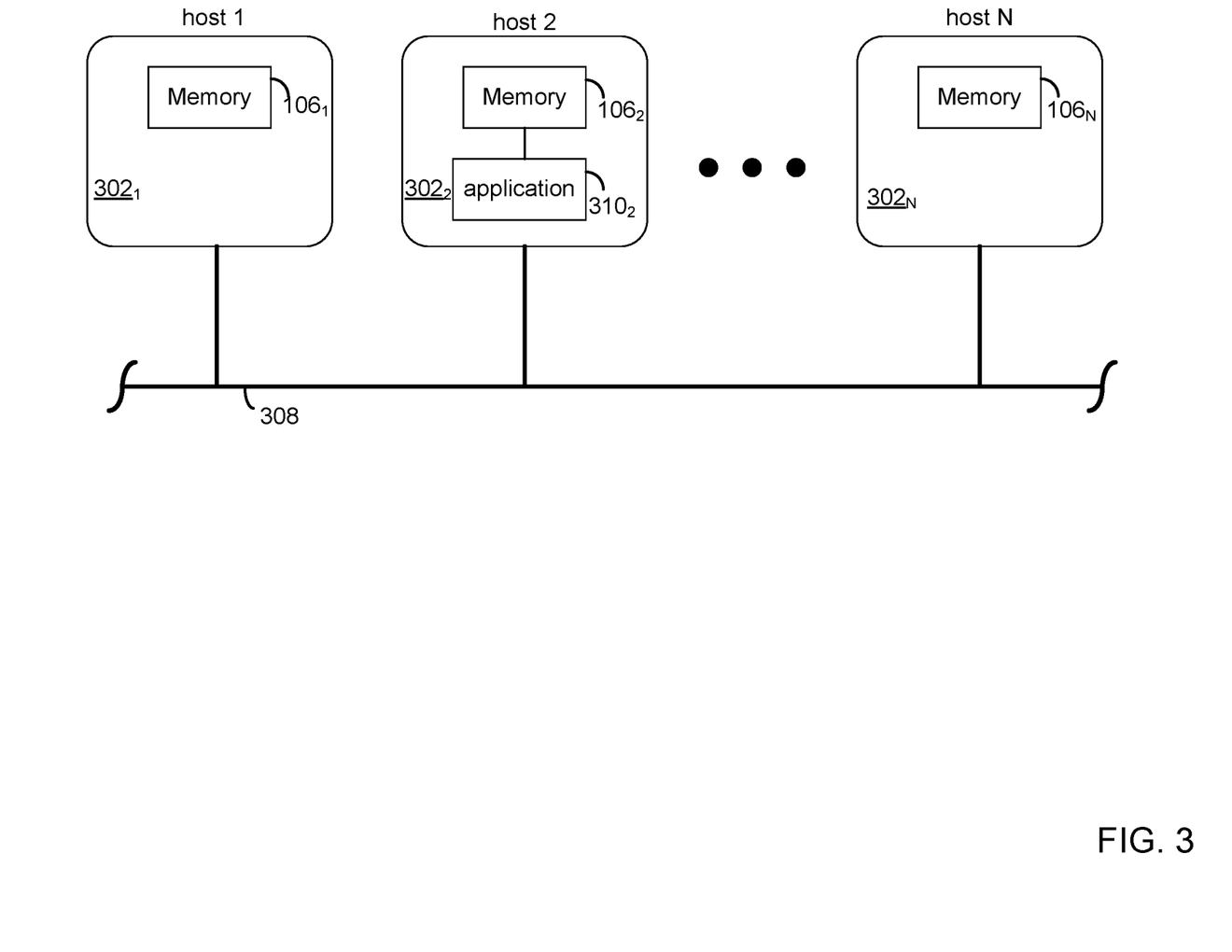
FIG. 3 depicts a plurality of hosts with one of the hosts running an application, in an embodiment.

FIG. 3 depicts a plurality of hosts with one of the hosts running an application. Each host has an arrangement similar computer system 100 of FIG. 1, including memories $106_1$-$106_N$ and is interconnected to the other hosts by a network 308, which can be a local or wide area network. Application $310_2$ runs on host $302_2$ but depends on pages of memory not present on host $302_2$ but contained in another host, say host $302_1$, which is hereinafter referred to as a remote host. Application $310_2$ depends on pages containing application code and/or application data which are required for it to execute on host $302_2$. The remote host is thus the host responsible for memory $106_1$ which contains pages on which the application $310_2$ depends.

Figure 4A:
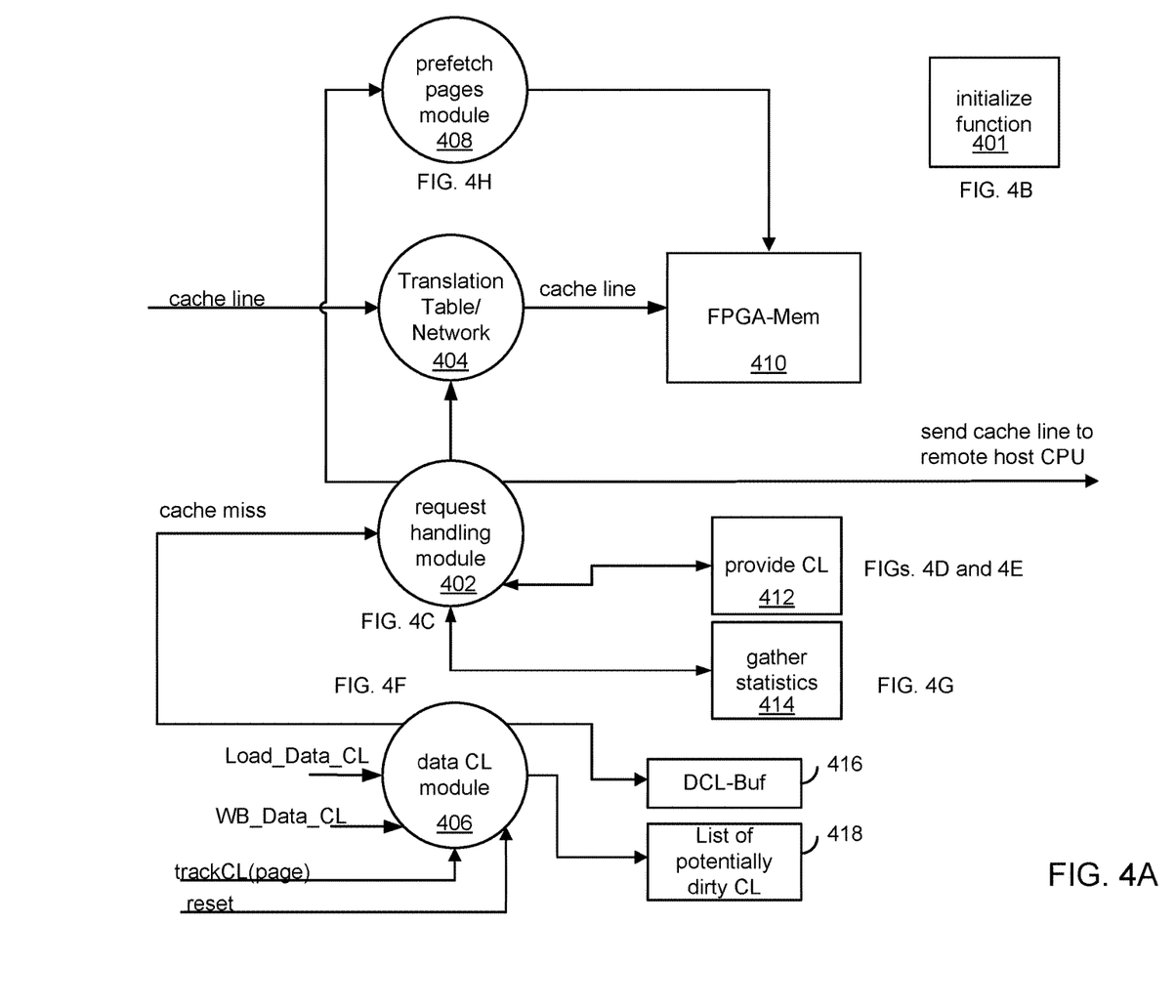
FIG. 4A is a graphical depiction of the components involved remote operations, such as memory swapping, caching and pre-fetching, in an embodiment.

FIG. 4A is a graphical depiction of the components involved in remote operations such as memory swapping, caching and pre-fetching. FIG. 4A includes translation table and network function 404, an initialize function 401 described in reference to FIG. 4B, a request handling module 402 described in reference to FIG. 4C, a data CL module 406 described in reference to FIG. 4F, a dirty cache line buffer (DCL-Buf) 416, a list 418 of potentially dirty cache lines, a prefetch pages module 408 described in reference to FIG. 4H, a provide CL function 412 described in reference to FIGS. 4D and 4E, a gather statistics function 414 described in reference with FIG. 4G and a memory (FPGA-Mem) 410 attached to FPGA 112.

Figure 4B:
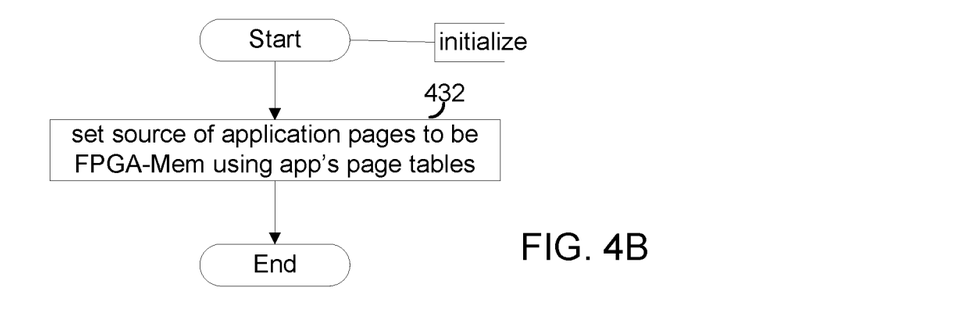
FIG. 4B depicts a flow chart of the initialize function, in an embodiment.

FIG. 4B depicts a flow chart of the initialize function. In step 432, function 401 sets the source of the application pages to be FPGA-Mem 410 rather than the actual memory source by altering the application's page tables. This makes FPGA 112 responsible for the memory pages of the application and allows FPGA 112 to intervene on cache misses and avoid causing page faults, which are exceptions handled by software (e.g., hypervisor 111) other than the application and caused by accesses to pages that are not present on the host running the application. In one embodiment, hypervisor 111 performs step 432.

Figure 4C:
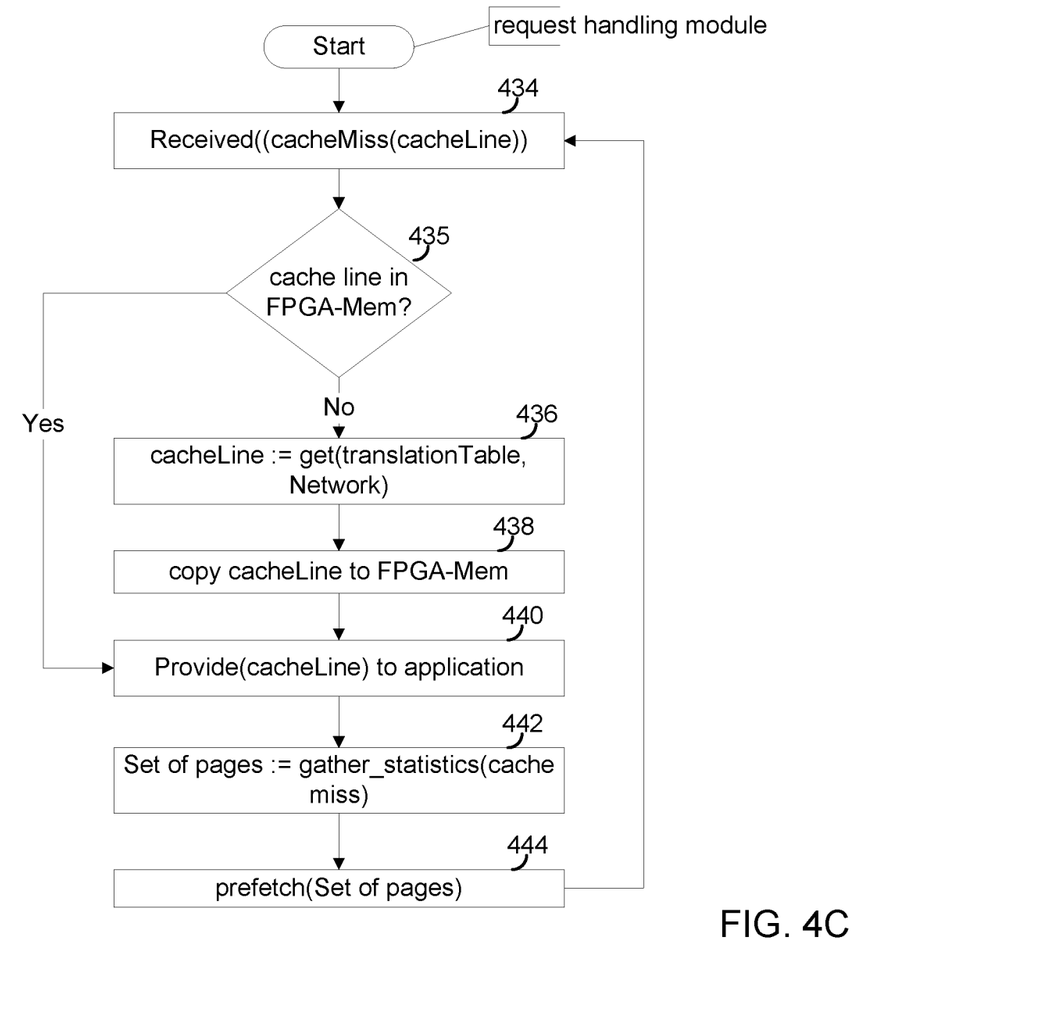

FIG. 4C depicts a flow chart of the request handling module. In step 434, module 402 receives a 'cacheMiss(cacheLine)' message from data CL module 406, where a cache miss refers to an access of a CPU cache specifying a cache line that is currently not present (i.e., missing) in that CPU cache. Module 402 responds to the message by determining in step 435 whether the cache line is present in FGPA-Mem 410. If the cache line is not present, then module 402 obtains the requested cache line (CL) satisfying the cache miss in step 436 using translation table and network function 404 via NIC 216 in FPGA 112. In step 438, module 402 copies the obtained CL to FPGA-Mem 410 and in step 440, sends the obtained CL to the application. If the cache line is present as determined in step 435, then module 402 provides the cache line to the application in step 440. In step 442, module 402 optionally gathers statistics on the cache miss so that it can optionally perform page pre-fetches to anticipate cache misses. In an embodiment, module 402 is included in application-specific modules 218 in FPGA 112, which performs steps 434 through 444.

Figure 4D:
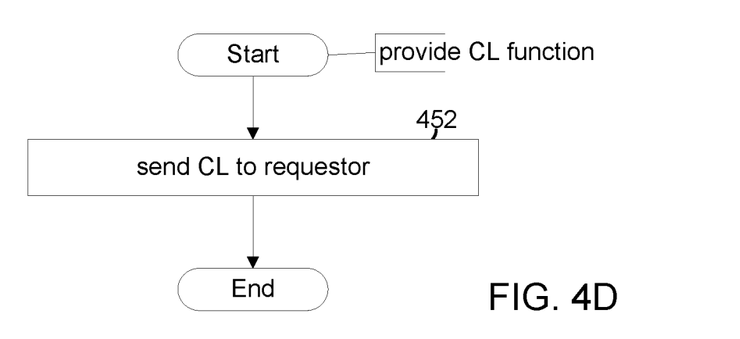
FIG. 4D depicts a flow chart of a first embodiment of a provide CL function.
Figure 4E:
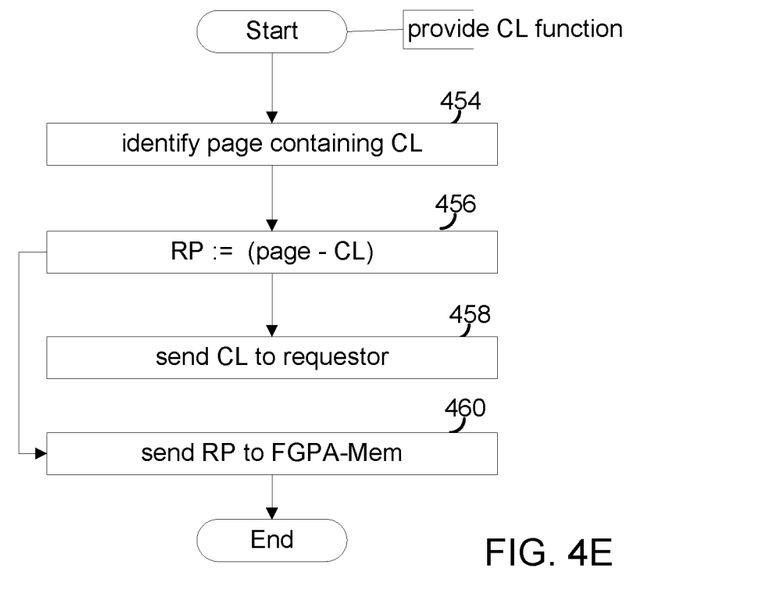
FIG. 4E depicts a flow chart of a second embodiment of the provide CL function.

FIGS. 4D and 4E depict flow charts for the provide CL function. In step 452, function 412 simply sends the CL satisfying the miss to the requestor. In step 454 in an alternative embodiment, function 412 identifies the page containing the cache line (CL). In step 456, function 412 determines the rest of the page (RP, i.e., the portion of the page excluding the CL). In steps 458 and 460, function 412 sends the CL to the requestor and the RP to FPGA-Mem 410 concurrently. In this manner, the requestor gets the requested cache line as fast as possible and proceeds while the remaining portion of the page is pre-fetched and added to FPGA-Mem 410. In one embodiment, function 412 is included in application-specific modules 218 in FPGA 112, which performs steps 452 or 454-460.

Figure 4F:
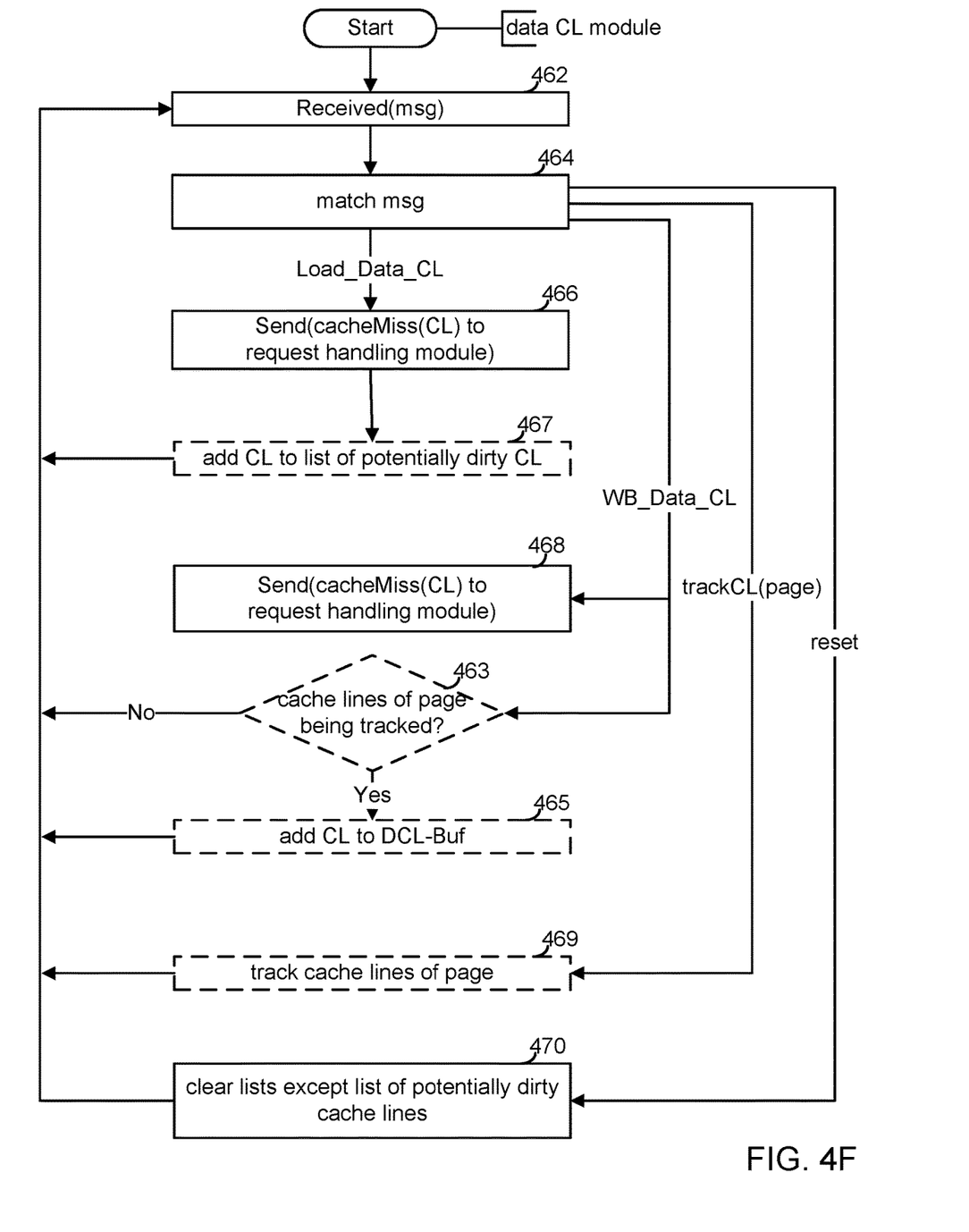
FIG. 4F depicts a flow chart of the data CL module, in an embodiment.

FIG. 4F depicts a flow chart of the data CL module. Data CL module 406 monitors cache coherence events on the coherence interconnect 114. In step 462, module 406 receives a message and in step 464, matches the message to either a 'Load_Data_CL', a 'WB_Data_CL' message, a 'trackCL(page)' message or a 'reset' message. In step 466, module 406 handles the 'Load_Data_CL' by sending a 'cacheMiss(cacheLine)' message to request handling module 402. In optional step 467, module 406 adds the cache line in the cache miss to list 418 of potentially dirty cache lines. In step 468, module 406 handles the 'WB_Data_CL' message by sending a 'cacheMiss(cacheLine)' message to request handling module 402. In steps optional steps 463 and 465, module 406 handles the 'WB_Data_CL' message by determining in step 463 whether cache line of a page are being tracked and if so, then in step 465 adding the cache line to DCL-Buf 416. In optional step 469, module handles the 'trackCL(page)' message by tracking cache lines of the page specified in the message. In step 470, module 406 handles the 'reset' message by clearing its internal lists e.g., DCL-Buf 416, but not list 418 of potentially dirty cache lines. In an embodiment, module 406 is included in application-specific modules 218 in FPGA 112, which performs steps 462 through 470. Though Data CL module 406 can monitor cache coherence events in the present context, data CL module 406 can monitor cache coherence events in other environments as well as it monitors coherence events on a coherence interconnect between physical processors.

Figure 4G:
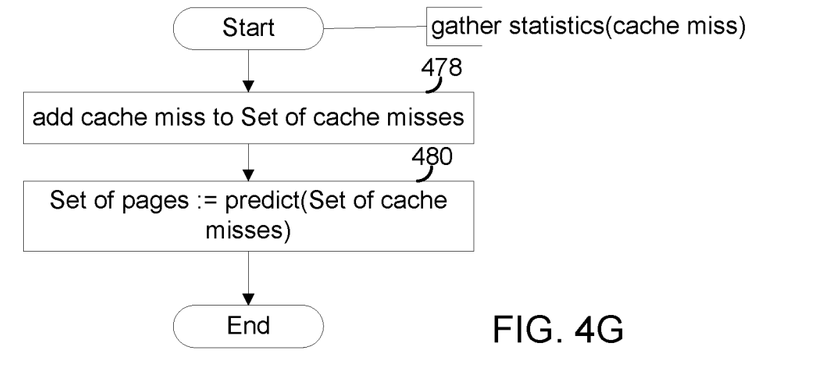
FIG. 4G depicts a flow chart of the gather statistics function, in an embodiment.

FIG. 4G depicts a flow chart of the gather statistics function. In step 478, function 414 adds each cache miss to a set of cache misses that it is recording. In step 480, function 414 uses the current set of cache misses to predict a set of pages that may be needed by the application. In an embodiment, function 414 is included in application-specific modules 218 in FPGA 112, which performs steps 478 and 480.

Figure 4H:
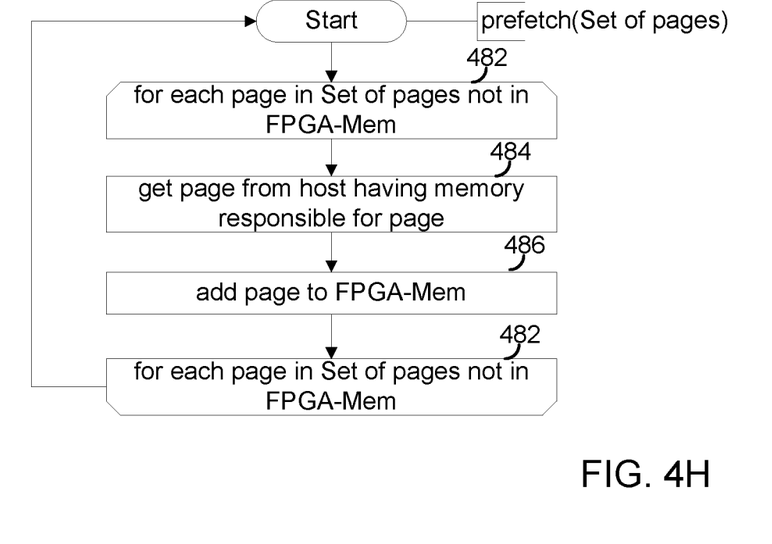
FIG. 4H depicts a flow chart of the prefetch pages module, in an embodiment.

FIG. 4H depicts a flow chart for the prefetch pages module. In step 482, module 408 creates an iterator over the set of pages predicted by the gather statistics function. In step 484, module 408 gets each page from the host having the memory responsible for the page. In step 486, module 408 adds the page to FPGA-Mem 410. In one embodiment, module 408 is included in application-specific modules 218 in FPGA 112, which performs steps 482-486.

The remote memory operation has improved efficiency because no page faults are involved and traffic needed to handle cache misses is reduced to that of obtaining cache lines, In addition, pages are predicted and obtained in the background based on the cache misses, thereby reducing latency for servicing a cache miss.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for running, on a local host, an application dependent on remote memory of a remote host, comprising:
   indicating to the running application that pages of the running application are all present in local memory of the local host when at least one page of the running application is not present in the local memory so that memory accesses by the running application cause cache misses instead of page faults;
   receiving a notice of a cache miss caused by the running application running on the local host;
   obtaining a cache line satisfying the cache miss from the remote host responsible for the remote memory containing the cache line using a translation table and a network connection to the remote host;
   copying the obtained cache line into the local memory; and
   providing the obtained cache line to the running application.

2. The method of claim 1, wherein providing the obtained cache line to the running application includes:
   determining for a page in the remote memory containing the obtained cache line, a remaining portion of the page not containing the obtained cache line; and
   providing the remaining portion of the page to the local memory concurrently with providing the obtained cache line to the running application.

3. The method of claim 1, wherein indicating to the running application that pages of the running application are all present in the local memory includes altering page tables relating to the running application.

4. The method of claim 1, further comprising:
   monitoring cache coherence events caused by the running application; and
   providing the notice based on the monitored cache coherence events.

5. The method of claim 4, wherein the monitored cache coherence events include a load of the cache line.

6. The method of claim 4, wherein the monitored cache coherence events include a write of the cache line.

7. The method of claim 1, further comprising:
   gathering cache miss statistics to aid in pre-fetching of pages from the remote host; and
   predicting a set of pages to be accessed based on the cache miss statistics.

8. The method of claim 7, further comprising:
   pre-fetching the set of pages from the remote host; and
   copying the set of pages into the local memory.

9. A device for assisting an application dependent on remote memory of a remote host to run on a local host, the device comprising:
   a first circuit configured to:
      receive a notice of a cache miss caused by the application running on the local host, wherein cache misses occur due to page tables of the running application being programmed to indicate that all pages of the running application are present in a local memory of the local host when at least one page of the running application is not present in the local memory so that memory accesses by the running application cause cache misses instead of page faults;
      obtain a cache line satisfying the cache miss from the remote host responsible for remote memory containing the cache line using a translation table and a network connection to the remote host;
      copy the obtained cache line into the local memory; and
      provide the obtained cache line to the running application; and
   a second circuit configured to:
      monitor cache coherence events caused by the running application; and
      provide the notice of the cache miss to the first circuit.

10. The device of claim 9, wherein the first circuit being configured to provide the obtained cache line to the running application includes being configured to:

determine for a page in the remote memory containing the obtained cache line, a remaining portion of the page not containing the obtained cache line; and provide the remaining portion of the page to the local memory concurrently with providing the obtained cache line to the running application.

11. The device of claim 9, wherein the device is further configured to:

gather cache miss statistics to aid in pre-fetching of pages from the source host; and predict a set of pages to be accessed based on the cache miss statistics.

12. The device of claim 11, wherein the device is further configured to:

pre-fetch the set of pages from the remote host; and copy the set of pages into the local memory.

13. A computer system comprising:

a CPU residing in a first CPU socket of the system;

a first memory coupled to the CPU, the CPU running a hypervisor and an application residing in the first memory;

a device residing in a second CPU socket of the system;

a second memory coupled to the device;

wherein the hypervisor is configured to indicate to the system that pages of the running application are all present in the second memory when at least one page of the running application is not present in the second memory so that memory accesses by the running application cause cache misses instead of page faults; and wherein the device is configured to:

receive a notice of a cache miss caused by the running application;

obtain a cache line satisfying the cache miss from a remote host responsible for a remote memory containing the cache line using a translation table and a network connection to the remote host;

copy the obtained cache line into the second memory; and provide the obtained cache line to the running application.

14. The system of claim 13, wherein being configured to provide the obtained cache line to the running application includes being configured to:

determine for a page containing the obtained cache line, a remaining portion of the page not containing the obtained cache line; and provide the remaining portion of the page to the second memory concurrently with providing the obtained cache line to the running application.

15. The system of claim 13, wherein the hypervisor being configured to indicate to the system that pages of the running application are all present in the second memory includes being configured to alter page tables of the running application.

16. The system of claim 13, wherein the device is further configured to:

monitor cache coherence events caused by the running application; and provide the notice based on the monitored cache coherence events.

17. The system of claim 16, wherein the monitored cache coherence events include a load of the cache line.

18. The system of claim 16, wherein the monitored cache coherence events include a write of the cache line.

19. The system of claim 13, wherein the device is further configured to:

gather cache miss statistics to aid in pre-fetching of pages from the remote host; and predict a set of pages to be accessed based on the cache miss statistics.

20. The system of claim 19, wherein the device is further configured to:

pre-fetch the set of pages from the remote host; and copy the set of pages into the second memory.

* * * * *